United States Patent
Gerber et al.

(10) Patent No.: US 9,537,251 B2
(45) Date of Patent: Jan. 3, 2017

(54) SECURING DEVICE FOR GIS

(71) Applicant: Alstom Technology Ltd., Baden (CH)

(72) Inventors: Philip Gerber, Unterentfelden (CH); Robert Lüscher, Seon (CH); Lukas Treier, Holziken (CH)

(73) Assignee: ALSTROM TECHNOLOGY LTD, Baden (CH)

( * ) Notice: Subject to any disclaimer, the term of this patent is extended or adjusted under 35 U.S.C. 154(b) by 0 days.

(21) Appl. No.: 14/767,756

(22) PCT Filed: Feb. 19, 2014

(86) PCT No.: PCT/EP2014/053209
§ 371 (c)(1),
(2) Date: Aug. 13, 2015

(87) PCT Pub. No.: WO2014/128152
PCT Pub. Date: Aug. 28, 2014

(65) Prior Publication Data
US 2015/0380865 A1  Dec. 31, 2015

(30) Foreign Application Priority Data
Feb. 21, 2013  (FR) ..................................... 13 51506

(51) Int. Cl.
*H01R 13/02* (2006.01)
*H01R 13/52* (2006.01)
*H02G 5/06* (2006.01)
*H01R 43/20* (2006.01)

(52) U.S. Cl.
CPC .......... *H01R 13/5219* (2013.01); *H01R 43/20* (2013.01); *H02G 5/068* (2013.01)

(58) Field of Classification Search
CPC ..... H01R 13/5219; H01R 43/20; H01R 13/02; H01R 13/04
USPC .......................... 439/271, 78, 884, 891, 908
See application file for complete search history.

(56) References Cited

U.S. PATENT DOCUMENTS

| | | | |
|---|---|---|---|
| 3,911,197 A | 10/1975 | Kruger | |
| 4,550,219 A | 10/1985 | Bolin | |
| 6,268,562 B1 | 7/2001 | Yokoyama | |
| 6,445,569 B1 * | 9/2002 | Shichida | H02B 13/035 174/167 |
| 8,912,446 B2 * | 12/2014 | Choi | H02G 15/34 174/15.4 |
| 2002/0158721 A1 | 10/2002 | Plummer | |

FOREIGN PATENT DOCUMENTS

| | | |
|---|---|---|
| CN | 201725927 U | 1/2011 |
| DE | 26 24 325 A1 | 3/1977 |

OTHER PUBLICATIONS

International Search Report issued in Application No. PCT/EP2014/053209 dated Apr. 3, 2014.
(Continued)

*Primary Examiner* — Khiem Nguyen
(74) *Attorney, Agent, or Firm* — Pearne & Gordon LLP (57) ABSTRACT

A fastener device for a gas-insulated substation (GIS) type installation comprising a threaded shank and a ring including a duct configured to receive the threaded shank, the ring being housed in a supporting insulator of the invention.

17 Claims, 5 Drawing Sheets

(56) References Cited

OTHER PUBLICATIONS

Written Opinion issued in Application No. PCT/EP2014/053209 dated Apr. 3, 2014.
Search Report issued in French Patent Application No. FR 1351506 dated Aug. 9, 2013.
International Preliminary Report on Patentability issued in Application No. PCT/EP2014/053209 dated Jun. 22, 2015.
U.S. Appl. No. 14/436,313, "Electrical Equipment Including a Conductor Mounting Between Two Casing Portions" filed Apr. 16, 2015.
U.S. Appl. No. 14/769,853, "Method of Extracting a Jacket of a Gas Insulated Substation (GIS) Under a Metal Casing" filed Aug. 24, 2015.
Office Action issued in Chinese Patent Application No. 201480009773 dated Nov. 2, 2016.

* cited by examiner

SECURING DEVICE FOR GIS

TECHNICAL FIELD

The invention relates to the assembly of high- or medium-voltage gas-insulated substations (GIS). Substations of this type comprise switchgear, in particular busbar section isolators, circuit breakers, or grounding switches. Such pieces of switchgear are generally insulated from one another using sulfur hexafluoride (SF6) in tanks under pressure.

The invention relates more particularly to a fastener device for use in such compartmentalized installations at medium or high voltage.

A distinction can be made between different types of GIS: single-phase installations and three-phase installations. In single-phase installations, a tank contains only the live portions of a single phase. In three-phase equipment, a tank contains the live portions of three phases.

The present invention applies both to single-phase GISs and to three-phase GISs.

The invention may also be used for any type of compartmentalized equipment at medium or high voltage, e.g. in gas-insulated lines (GIL), which are conductive lines insulated on the same principle, e.g. for connecting GISs to overhead lines.

STATE OF THE PRIOR ART

Figure 1:
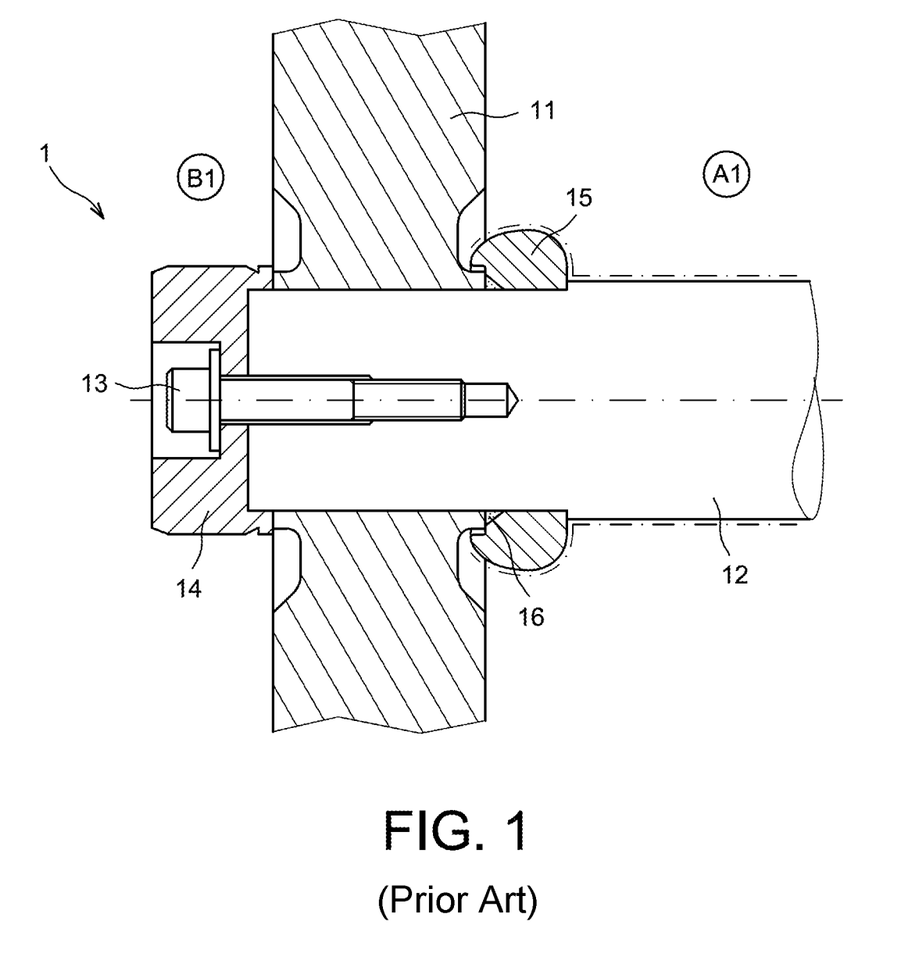
FIG. 1 is a view of a prior art fastener device between a conductor and a bush situated on either side of a supporting insulator in two gastight compartments and under pressure.

FIG. 1 shows a fastener device 1 presently in use with GISs. Said FIG. 1 shows a supporting insulator 11 comprising a duct receiving a conductor 12. The conductor 12 is fastened in the duct of the supporting insulator 11 by means of a fastener member 13 clamped against a bush 14. In that example, the fastener member 13 comprises a screw and an interposed washer. Another conductor, e.g. of the type of conductor 12, may be connected against the bush 14. In that event, that other conductor will have a hollow end encompassing the bush 14 while at the same time enabling electrical connection to be made.

When the GIS is in service, the conductor 12 is live at a voltage of 30 kilovolts (kV) or more. A corona shield 15 is necessary in order to prevent any electrical discharge around the periphery of the conductor 12.

The conductor 12 is typically made of an aluminum or copper alloy. The corona shield 15 is typically made of conductive or partially conductive material.

In addition to its role of physically supporting the conductor 12, the supporting insulator 11 has the role of separating the compartments A1 and B1 that are filled with gas under pressure. Compartments A1 and B1 situated on either side of the supporting insulator 11 need to be insulated relative to each other in gastight manner. An O-ring 16 between the corona shield, the conductor, and the supporting insulator 11 provides said gastightness.

The various components of the tanks are assembled at the factory and on-site. In general manner, it is desirable to limit assembly time on-site.

SUMMARY OF THE INVENTION

The invention thus provides a fastener device for a GIS-type installation, comprising a conductive threaded shank and a conductive ring, the ring including a passage that is configured to receive the threaded shank in gastight manner, the fastener device being designed to electrically connect two conductive elements and to keep each of them mounted on the threaded shank.

The new fastener device is designed to be suitable for being partially pre-assembled at the factory and therefore to reduce on-site assembly time. Pre-assembly also limits on-site assembly errors.

The fastener device of the invention has the advantage of being capable of being used both in single-phase installations and in three-phase installations.

For three-phase installations, the rings may be in alignment on the supporting insulator, or they may be arranged in a triangle or even in a different configuration.

According to an advantageous characteristic, the threaded shank further comprises at least a first gastight member, e.g. an annular gasket, said member being placed in a groove formed in a middle portion of the threaded shank.

Advantageously, the groove is made on a boss formed on the middle portion.

According to a particular characteristic of the invention, the threaded shank includes at least a thread on each side of its middle portion.

The presence of threads on the shank makes it possible to limit electrical resistance at the points of contact between conductive parts and therefore to reduce the hot spots in GIS.

The fact of having several threads further enables overall assembly to be broken down into several steps of assembling sub-modules, some of which can advantageously be performed remote from the final assembly site of the GIS.

Advantageously, the threaded shank may comprise at least a second gastight member, said member being placed in a second groove formed in the middle portion of the threaded shank.

By way of example, the two conductive elements may each be a portion of a busbar or a bush.

In an assembled state of the GIS-type installation, i.e. in an assembled state of the fastener device in a GIS-type installation:

the threaded shank is placed in the passage of the ring in gastight manner, and/or;

the ring is housed in gastight manner in an supporting insulator of the installation and/or a first and a second thread are engaged on respective threads of a first and a second conductive element, and/or;

the fastener device electrically connects the two conductive elements and keeps each of them mounted on a respective one of the two faces of the ring, on both sides of the supporting insulator;

and/or, the shank extends beyond the faces of the ring when it is placed in the passage, e.g. at least one respective thread extending beyond each face.

The diameter of each thread of the threaded shank is preferably less than the minimum diameter of the passage. The threaded shank is thus inserted in the passage of the ring very simply by sliding, enabling easy handling of the sub-module comprising the threaded shank and the first conductive element.

According to a particularly advantageous characteristic, at least one keying element is provided on a given face of the ring so as to allow only one particular end of a single conductive element to be installed against said given face.

The fastener device is thus designed to avoid orientation errors of the conductive elements.

When the threaded shank is placed in the passage of the ring, the shank may extend beyond each side of the ring by a length lying in the range 20 millimeters (mm) to 60 mm.

The invention further provides a unit comprising a supporting insulator for GISs and a fastener device as described above, at least one ring of the fastener device being placed in the supporting insulator. By way of example, the supporting insulator is overmolded around at least one ring of the fastener device.

In a particular embodiment, the supporting insulator is overmolded around rings of three fastener devices.

Advantageously, the supporting insulator is made of polyester resin or epoxy resin.

The invention further provides a GIS-type installation comprising a supporting insulator provided with at least one fastener device as described above.

Advantageously, the conductive elements are mounted on the threaded shank and/or against the ring 34.

The invention further provides a method of assembling a first conductive element and a second conductive element on either side of a unit as described above, comprising the following steps:

mounting a first end of the threaded shank with an end of the first conductive element;

inserting a second end of the threaded shank through the passage of the ring of the fastener device; and mounting the second end of the threaded shank with an end of the second conductive element.

BRIEF DESCRIPTION OF THE DRAWINGS

The invention can be better understood and other characteristics, details, and advantages thereof appear more clearly on reading the following description, made by way of non-limiting example, and with reference to the accompanying drawings, in which.

DETAILED DESCRIPTION OF PARTICULAR IMPLEMENTATIONS

Figure 2:
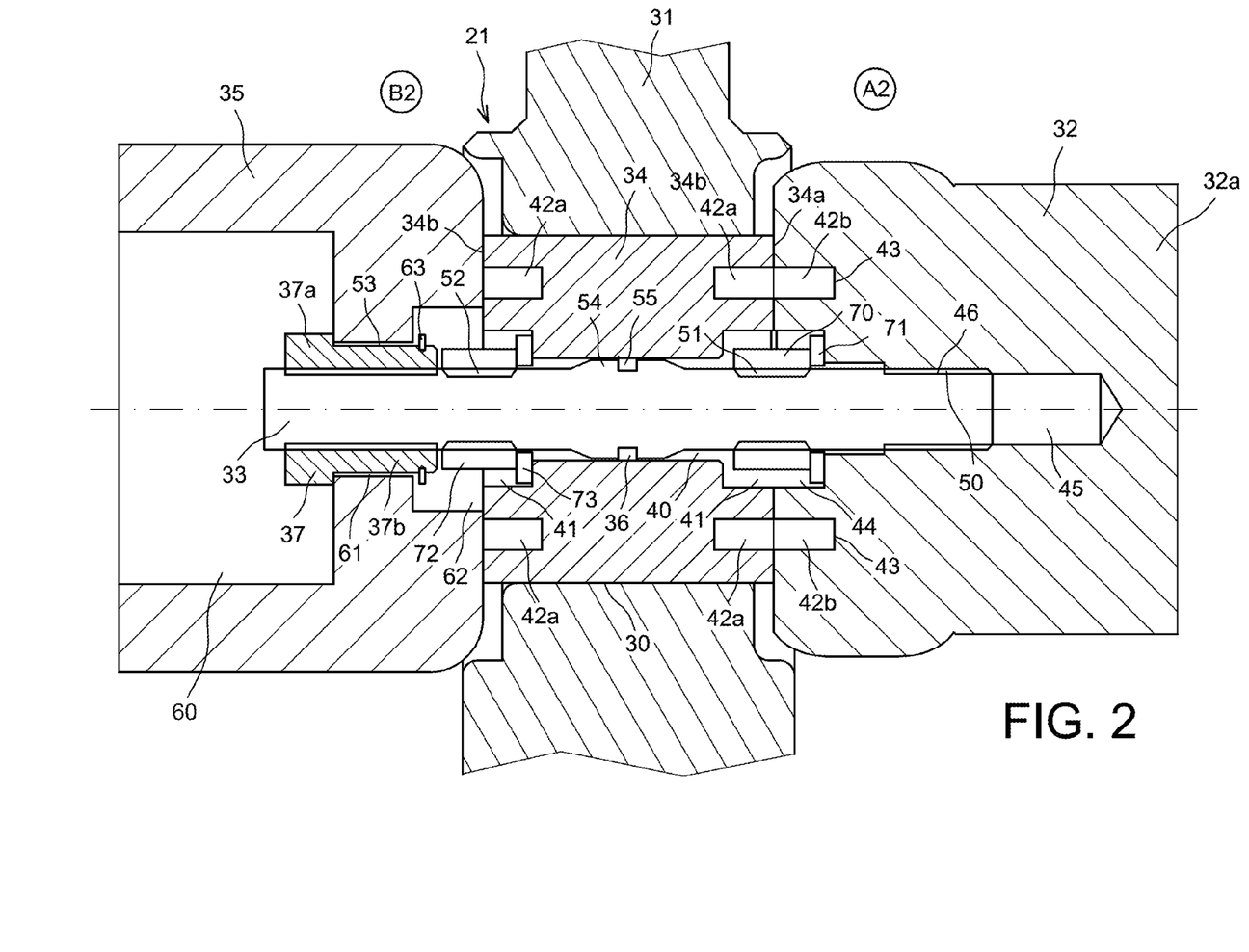
FIG. 2 is a section view of a fastener device of the invention between a conductor and a bush situated on either side of a supporting insulator in two gastight compartments, implementing a stud and an intermediate ring.

FIG. 2 shows a supporting insulator 31 separating two compartments A2 and B2 filled with gas under pressure. A conductor 32, in this example a portion of a busbar, and a bush 35 are mounted on the supporting insulator 31 by means of a fastener device 21. The fastener device 21 comprises a threaded shank 33 and a ring 34.

The two compartments A2 and B2 are formed in a GIS tank (not shown).

The supporting insulator 31 is electrically insulating and is made of polyester resin or epoxy resin type materials. The ring 34 is placed in the supporting insulator 31. In this embodiment, the insulator 31 is made by overmolding around the ring 34. Alternatively, and by way of example, the ring 34 is inserted into the insulator 31 at the time of final mounting.

The ring 34 is an annular element extending between two plane faces 34a and 34b. On each of its two faces, the ring 34 presents a bore 41 and holes 42a placed around the bore 41. In this embodiment, two holes 42a are formed in each face. There may be a greater or smaller number of said holes.

A central bore 40 of diameter that is smaller than the diameter of the bores 41 extends between the end walls of said bores 41.

The threaded shank 33 is an elongate part that includes a boss 54 in its middle portion. The boss 54 is provided with a circumferential groove 55 designed to accommodate a sealing element 36. The sealing element 36 is in this embodiment an O-ring. The O-ring 36 may be made of an electrically insulating or partially conductive material such as silicone rubbers or ethylene-propylene-diene terpolymer (EPDM).

Advantageously, it is possible to use more than one O-ring 36, e.g. two of them, each one being placed in a circumferential groove of the same type as the groove 55 (variant not shown). The presence of two O-rings makes it possible to limit the leak rate to a value that is less than the limit of 0.5% per year imposed by IEC standard 62271-203.

The threaded shank 33 further includes four threads 50 to 53 placed in pairs on each side of the boss 54.

Advantageously, the threads 50 and 51 may coincide in a single thread towards a first end of the shank 33, and the threads 52 and 53 may coincide in a single other thread towards the second end of the shank 33.

The threaded shank 33 is designed to be mounted in the ring 34, the boss 54 being placed in the bore 40 and the O-ring 36 preventing any exchange of gas (in this example, SF6) between the compartments A2 and B2. In this example, the shank 33 is designed to extend beyond each side of the ring when it is placed in the bore 40. Preferably, the shank 33 extends beyond each side of the ring 34 by a length lying in the range 20 mm to 60 mm. By way of non-limiting example, the shank 33 may extend beyond each side of the ring by about 40 mm. The use of a long shank 33 offers better mechanical stability.

The conductor 32 is a longitudinal element, e.g. a portion of a busbar, designed to be mounted by a first end 32a against a first face 34a of the ring 34.

A bore 44 and holes 42b are formed in the surface of the first end 32a.

Provision is made for the holes 42b to be placed facing the holes 42a in the particular assembly position shown in FIG. 2. Provision is made for each pair of holes 42a and 42b that are placed facing each other to accommodate a peg 43. The pegs 43 and the holes 42a and 42b thus serve as a keying means when the conductor 32 is being put into place against the ring 34, limiting assembly errors. The assembly position shown in FIG. 2 satisfies a desired angular orientation.

In a variant that is not shown, the conductor 32 presents a number of holes 42b and pegs 43 that is not equal to two, e.g. one or three.

In this embodiment, the bore 44 has the same dimensions as the bore 41 and provision is made for it to be placed facing said bore 41. A bore 45 of diameter that is smaller than that of the bore 44 extends from the end wall of said bore 44. A thread 46 is provided in the inside surface of the bore 45. Said thread 46 is designed to co-operate with the thread 50 so as to fasten together the threaded shank 33 and the conductor 32.

In this embodiment, the bush 35 presents a housing 60 and bores 61 and 62. The housing 60 is designed to receive the second end (not shown) of a conductor of the same type as the conductor 32. As shown in the figures, the housing 60 in this embodiment is configured for conductors having a second end of dimensions that are smaller than the first 32a. In a variant, the dimensions of the second end may be similar or larger than those of the first end 32a. If the dimensions of the ends of the conductor are selected to be similar, they are preferably configured so that the keying elements, such as for example, the holes 42a and 42b and the pegs 43, allow only one particular end to be put into place against a given face of the ring 34 in the particular assembly position shown in FIG. 2.

The bore 62 is arranged in the side of the bush that is remote from the housing 60.

The bore 61 extends from the end wall of the bore 62 to the end wall of the housing 60. The diameter of the bore 61 is smaller than the diameters of both of the housing 60 and of the bore 62.

In the embodiment shown, the fastener device 21 includes a sleeve 37. The sleeve 37 is designed to be mounted on the thread 53 in such a manner as to hold the bush 35 against a second face 34b of the ring 34. In order to do so, the sleeve 37 comprises a head 37a and a body 37b, both of which are cylindrical. Provision is made for the head 37a to come to press against the end wall of the housing 60 and the body 37b is provided so as to be inserted into the bore 61 and to extend beyond the bore 62.

Preferably, a retaining ring 63 is placed in an end groove of the body 37b, in the bore 62. The ring 63 has the role of retaining the sleeve 37 in the bush 35 in captive manner. It is thus possible to pre-assemble these two elements 35 and 37 in the factory so as to save time during installation of GISs at their final place of assembly.

In addition, in the embodiment shown, the bore 62 is designed to cover part of a nut 70 mounted on the end of the threaded shank 33.

Alternatively, in the absence of a retaining ring 63, the bore 62 and the bore 61 may form a single duct of constant diameter.

The ring 34, the threaded shank 33, the bush 35, the conductor 32, and the sleeve 37 are made of a conductive material selected from alloys of aluminum, of steel, or of copper. For further improved conductivity, the contact surfaces of the conductor 32, of the ring 34 and/or of the bush 35 are coated in silver.

There follows a description of an example of a process for mounting the conductor 32, the bush 35, and the fastener device 21 on the supporting insulator 31.

In a first step, in this embodiment, three sub-assemblies are pre-assembled.

Firstly, the threaded shank 33 is mounted in the first end 32a of the conductor 32, the thread 50 engaging in the thread 46. Also in this embodiment, a nut 70 and a washer 71 interposed on the thread 51 are also mounted. The nut 70 and the washer 71 have the role of preventing the shank 33 loosening relative to the conductor 32.

Independently of assembling the first sub-assembly comprising the shank 33 and the conductor 32, in this embodiment a second sub-assembly is formed by overmolding the supporting insulator 31 around the ring 34.

A third sub-assembly is assembled comprising the bush 35 and the sleeve 37, held together by the retaining ring 63.

It is possible to pre-assemble firstly the shank 33 and the conductor 32, and secondly the bush 35 and the sleeve 37 at the factory, i.e. away from the assembly site intended for the GIS.

In a second step, the shank 33 is inserted into the ring 34 by sliding. The keying pegs 43 are in place in the holes 42a and/or 42b. A desired orientation of the conductor 32 is thus ensured. The conductor 32 is thus placed in abutment against the ring 34. At that point, the portion of the threaded shank 33 carrying the threads 52 and 53 extends beyond the ring 34 away from the conductor.

In this embodiment, a nut 72 is mounted on the thread 52 with an interposed washer 73, the washer 73 engaging the end wall of the corresponding bore 41. The nut 72 and the washer 73 serve to hold the shank 33 and to ensure it is in a position in alignment with the ring 34 before the following step.

In a third step, the bush 35 may then be placed against the ring 34. The sleeve 37 is clamped on the thread 53 in such a manner as to hold the bush 35 against the ring 34.

The module obtained at the end of the second or third step, i.e. comprising the insulator 31, the conductor 32, the shank 33, the ring 34, and possibly the bush 35 and the sleeve 37 may also be assembled before it is put into place on the GIS. It is then possible to transport this module to the final installation site and to proceed with assembling the GIS in a short time.

Figure 3:
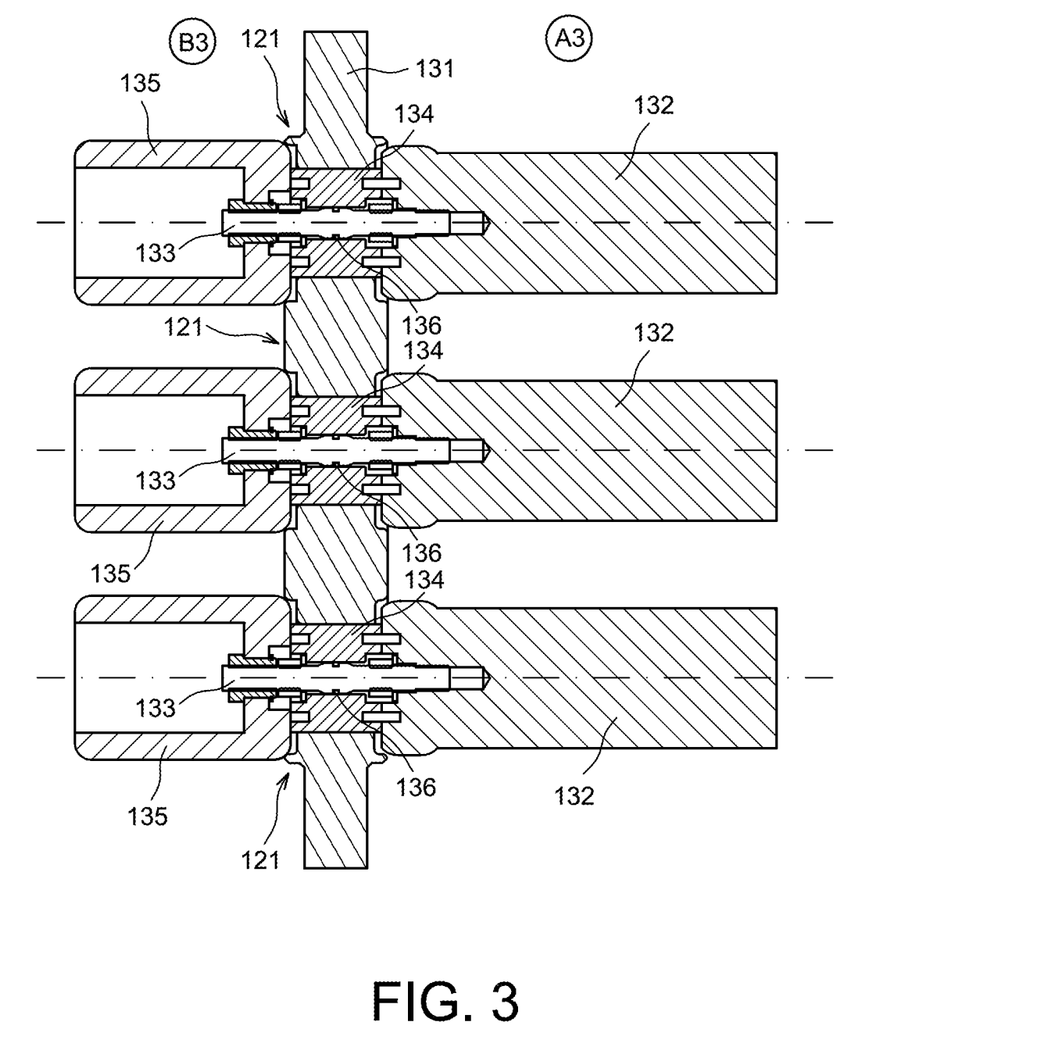
FIG. 3 is a section view of the fastener device of FIG. 2 implemented in a compartment of three-phase GIS.
Figure 4:
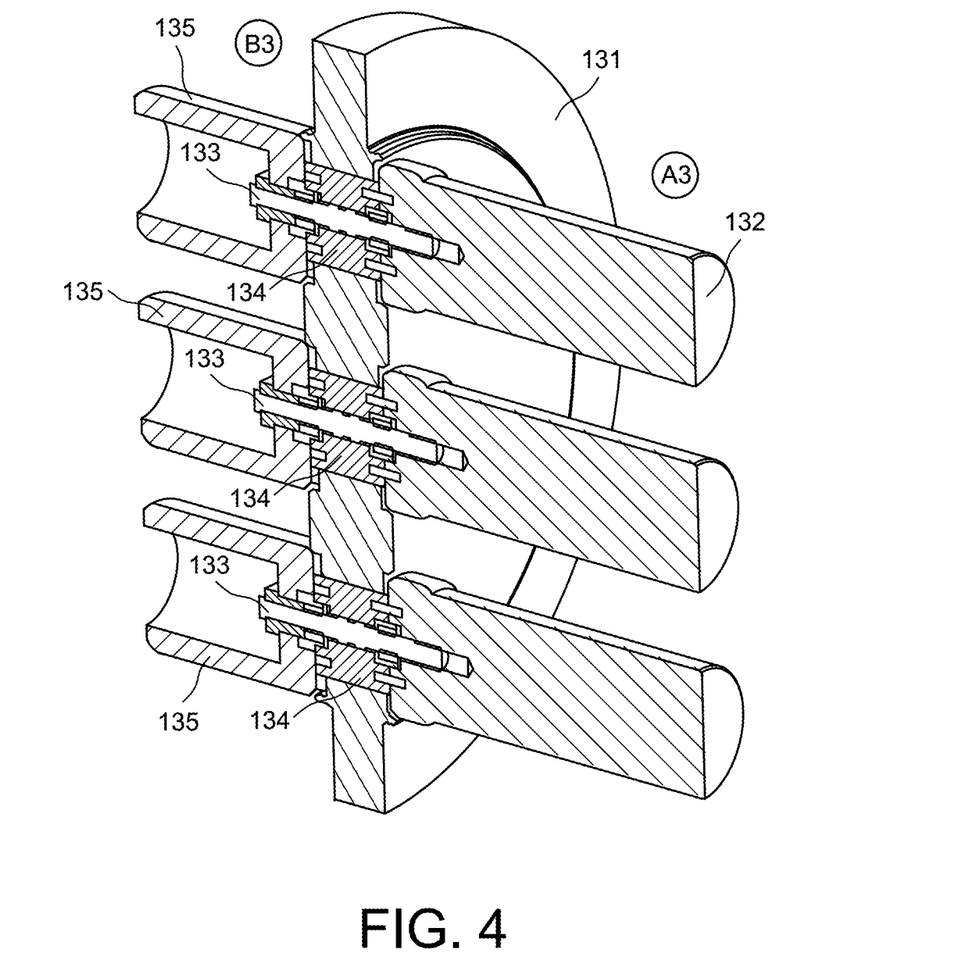
FIG. 4 is a section view in perspective of the elements shown in FIG. 3.

FIGS. 3 and 4 illustrate a supporting insulator 131 separating two compartments A3 and B3. The insulator 131 is suitable for a three-phase installation of the GIS type in which the three phases are placed in the same tanks. The insulator 131 accommodates three rings 134 of the same type as the ring 34. In this embodiment, the three rings 134 are placed relative to one another in a line.

The other elements shown in FIGS. 3 and 4 are substantially identical to the elements of the embodiment shown in FIG. 2. The reference numbers are thus increased by 100. For technical details, reference should be made to the description given above.

Like assembling the structure described with reference to FIG. 2, assembly of three phases on the same supporting insulator 131 may advantageously be carried out beforehand, away from the final assembly site. Final assembly is thus faster.

In a variant (not shown), the rings 134 are arranged in a triangle in the supporting insulator.

Figure 5:
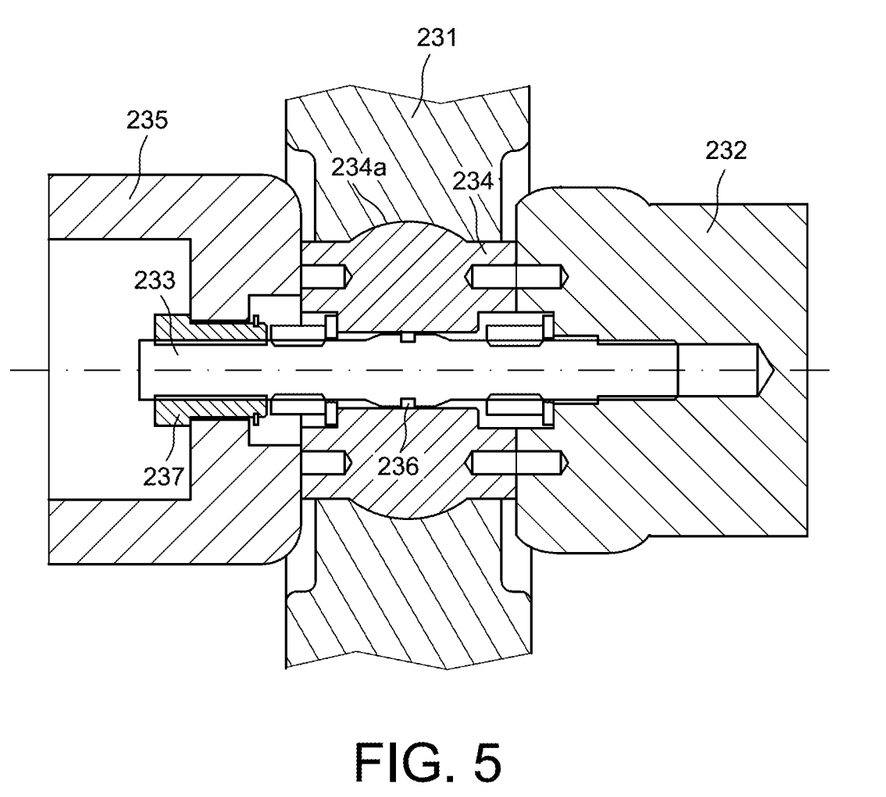
FIG. 5 is a variant of the fastener device of FIG. 2.

FIG. 5 shows a variant of the insulator 31 and of the ring 34. In this embodiment, the ring 234 includes an additional boss 234a in its middle portion. Preferably, the boss 234a is made integrally with the ring 234.

In a variant (not shown), the boss forms a portion of a part fitted on the ring.

It is possible to overmold a supporting insulator of the 231 type around a non-cylindrical ring such as the ring 234. The boss 234a makes it possible to make use of the method of overmolding using polyester resins or epoxy resins, by improving the hold of the supporting insulator around the ring and by making the ring and the supporting insulator inseparable.

The above description describes the assembly on the threaded shank of a first conductive element comprising a bush 35 and a sleeve 37 and of a second conductive element formed, in this example, by a conductor 32. In a variant that is not shown, the fastener device makes it possible to mount two conductive elements on the threaded shank, each element comprising a bush 35 and a sleeve 37. In an additional variant, the device makes it possible to mount on the threaded shank two conductors of the same type as the busbar portions 32.

Various variants are possible without going beyond the ambit of the invention.

What is claimed is:

1. A fastener device for a GIS-type installation, comprising a conductive threaded shank and a conductive ring, the conductive ring including a passage that is configured to receive the threaded shank in a gastight manner, the threaded shank extending beyond each side of the conductive ring when it is received in the passage, the fastener device being configured to connect together two conductive elements electrically and to keep each of them mounted on the threaded shank, wherein the two conductive elements each comprise a portion of a busbar or bush.

2. The fastener device according to claim 1, the threaded shank further comprising at least a first gastight member, said member being placed in a groove formed in a middle portion of the threaded shank.

3. The fastener device according to claim 2, the groove being made in a boss formed on the middle portion.

4. The fastener device according to claim 1, the threaded shank including at least a thread on each side of a middle portion.

5. A fastener device for a GIS-type installation, comprising a conductive threaded shank and a conductive ring, the ring including a passage that is configured to receive the threaded shank in gastight manner, the threaded shank extending beyond each side of the ring when it is received in the passage, the fastener device being configured to connect together two conductive elements electrically and to keep each of them mounted on the threaded shank, the threaded shank further comprising at least a first gastight member, said first gastight member being placed in a groove formed in a middle portion of the threaded shank, the threaded shank comprising at least a second gastight member, said second gastight member being placed in a second groove formed in the middle portion of the threaded shank.

6. The fastener device according to claim 1, at least one keying element being provided on a given face of the ring so as to allow a single end of a single one of the conductive elements to be installed against said given face.

7. A unit comprising a supporting insulator for GISs and the fastener device according to claim 1, at least one ring of the fastener device being placed in the supporting insulator.

8. The unit according to the claim 7, the supporting insulator being over molded around at least one ring of the fastener device.

9. The unit according to the claim 7, the supporting insulator being over molded around rings of three fastener devices.

10. The unit according to claim 7, the supporting insulator being made of polyester resin or epoxy resin.

11. A GIS-type installation comprising a supporting insulator provided with at least one fastener device according to claim 1.

12. The GIS-type installation comprising according to claim 11, the conductive elements being mounted on the threaded shank.

13. The GIS-type installation according to claim 11, the conductive elements being mounted against the ring.

14. A method of assembling a first conductive element and a second conductive element on either side of the unit according to claim 7, comprising the following steps:
   mounting a first end of the threaded shank with an end of the first conductive element;
   inserting a second end of the threaded shank through the passage of the ring of the fastener device; and
   mounting the second end of the threaded shank with an end of the second conductive element.

15. The fastener device according to claim 4, the threaded shank comprising at least a second gastight member, said member being placed in a second groove formed in the middle portion of the threaded shank.

16. A unit comprising a supporting insulator for GISs and the fastener device according to claim 1, the conductive ring of the fastener device being placed in a supporting insulator.

17. A GIS-type installation comprising:
   a supporting insulator that separates two compartments filled with pressurized gas; and
   a fastener device comprising a conductive threaded shank and a conductive ring, the conductive ring including a passage that receives the threaded shank in a gastight manner to inhibit the exchange of gas between the two compartments through the passage, the threaded shank extending beyond each side of the conductive ring, the fastener device being configured to connect together two conductive elements electrically and to keep each of them mounted on the threaded shank.

* * * * *